No. 708,984. Patented Sept. 16, 1902.
C. A. BARTLIFF.
METHOD OF TREATING AIR FOR FORCING MALT LIQUORS FROM KEGS.
(Application filed Nov. 8, 1901.)
(No Model.)
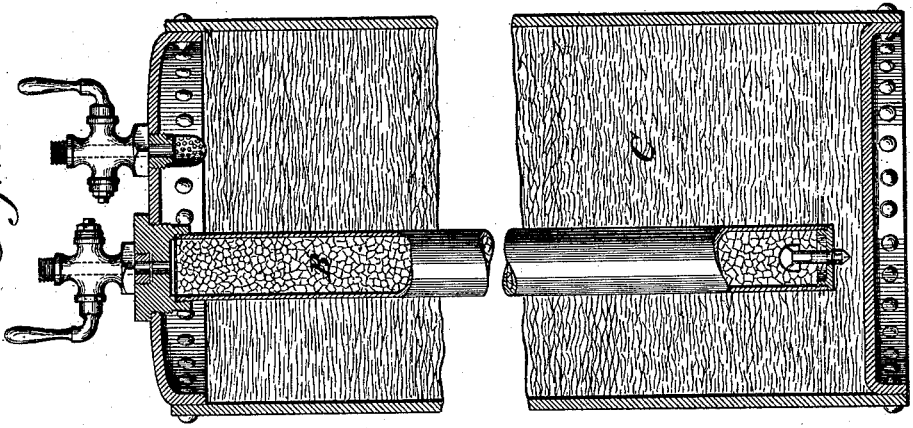
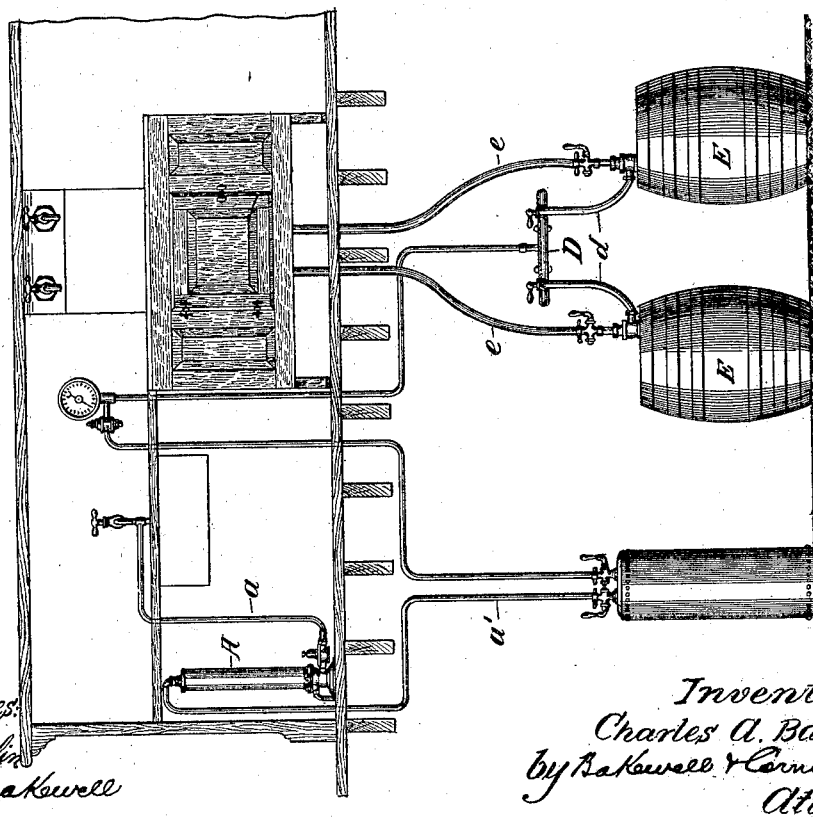
Witnesses:
O. A. Thelin
George Bakewell
Inventor:
Charles A. Bartliff
by Bakewell & Cornwall
Attys.

UNITED STATES PATENT OFFICE.

CHARLES A. BARTLIFF, OF ST. LOUIS, MISSOURI.

METHOD OF TREATING AIR FOR FORCING MALT LIQUORS FROM KEGS.

SPECIFICATION forming part of Letters Patent No. 708,984, dated September 16, 1902.

Application filed November 8, 1901. Serial No. 81,612. (No specimens.)

*To all whom it may concern:*

Be it known that I, CHARLES A. BARTLIFF, a subject of the King of Great Britain, residing at the city of St. Louis, State of Missouri, have invented a certain new and useful Improvement in Methods of Treating Air for Forcing Malt Liquors from Kegs, of which the following is a full, clear, and exact description, such as will enable others skilled in the art to which it appertains to make and use the same, reference being had to the accompanying drawings, forming part of this specification, in which—

Figure 1 is a view showing my improved method of treating air for forcing malt liquors from kegs in position. Fig. 2 is a vertical sectional view through the drum which contains hop-leaves.

This invention relates to a new and useful improvement in a method of treating air for forcing malt liquors from kegs, and is designed particularly for use in connection with a draft-beer apparatus, being employed in substantially the same manner as and in connection with ordinary force-pumps which are used to compress the air which is admitted under pressure to the surface of the beer. In my present invention I cause this air to be impregnated with hops before it is admitted to the surface of the beer in order that the air will impart to the beer a palatable flavor and fine aroma. In the accompanying drawings I have shown an apparatus wherein the air is compressed by a water-pump and impregnated with hops, after which it is admitted under pressure to the surface of the beer. I do not wish to be understood, however, as limiting my invention to the use of a water-pump, as there are other forms of apparatus which can be employed for compressing the air. Furthermore, in view of existing methods of forcing malt liquors from kegs my method may be carried out successfully by driving the compressed air from a drum or tank in which it may be stored, said compressed air being impregnated for the purposes herein described.

In the drawings, A indicates a source of pressure-supply, shown as an air-compressor operated by a water-motor, said water-motor being driven by water through a pipe $a$, as is well understood. The air compressed in the compressor A is conducted by a pipe $a'$ to a purifying-chamber B. This purifying-chamber is filled with sand, powdered charcoal, or other material through which the air may pass and by means of which foreign particles in the air may be arrested. After passing through this purifying-chamber the air is received into a chamber C, containing hop-leaves. These hop-leaves may be dry or moist, as desired, although where they are to be used for any length of time I prefer to have them dry because the moist leaves will in time become sour and moldy, so as to affect the quality of the impregnated air issuing from the hop-chamber after passing through the bed of hop-leaves. Where two or more kegs are to receive this impregnated pressure, the pressure is preferably conducted to a manifold D, whence it is conducted by pipes $d$ to the surface of the malt liquors in kegs E. The liquors in the kegs are conducted off through the pipes $e$ to some convenient point, where they are controlled by appropriate cocks, as usual.

In the above method it will be noted that the air is relieved of its foreign particles before being delivered into contact with the impregnating-hops. This purification of the air can obviously take place before or after the compression thereof. It will also be noted that, if desired, where a local compressor is used the air before being compressed can be forced through the purifying-chamber and through the hops, so as to become impregnated, and then compressed and delivered to the surface of the liquors to be forced from the kegs.

The word "air" used herein is intended to mean natural air as distinguished from air mixed with other recognized gases, said other gases being present to an appreciable extent.

I am aware that many minor changes in the construction, arrangement, and combination of the several parts of my invention can be made and substituted for those herein shown and described without in the least departing from the nature and principle of my invention.

Having thus described my invention, what I claim, and desire to secure by Letters Patent of the United States, is—

1. The herein-described method of treating air for forcing malt liquors from kegs, the same consisting in removing foreign particles from the air, passing the cleansed air through a chamber containing hop-leaves, and delivering the cleansed and impregnated air, under pressure, to the surface of malt liquor in a keg; substantially as described.

2. The herein-described method of treating air for use in forcing malt liquors from kegs, the same consisting in first compressing the air, then passing the same through a chamber containing a cleansing ingredient, then passing the air through a chamber containing dried hop-leaves, and finally delivering the cleansed and impregnated air, under pressure, to the surface of liquor in a keg; substantially as described.

In testimony whereof I hereunto affix my signature, in the presence of two witnesses, this 6th day of November, 1901.

CHARLES A. BARTLIFF.

Witnesses:
GEORGE BAKEWELL,
G. A. PENNINGTON.